United States Patent

[11] 3,631,338

| [72] | Inventors | Vincent F. Fitzpatrick;<br>Russell B. Richman, both of Richland, Wash. |
|---|---|---|
| [21] | Appl. No. | 837,799 |
| [22] | Filed | June 30, 1969 |
| [45] | Patented | Dec. 28, 1971 |
| [73] | Assignee | The United States of America as represented by the Secretary of the Interior |

[54] METHOD AND APPARATUS FOR DETERMINING GALVANIC CORROSION BY POLARIZATION TECHNIQUES
8 Claims, 3 Drawing Figs.

[52] U.S. Cl.................................................... 324/71 R,
23/253 C, 204/1 T
[51] Int. Cl.................................................................. G01n 27/00
[50] Field of Search............................................. 324/65, 71;
73/86; 204/1, 195; 338/13; 23/230, 253

[56] References Cited
UNITED STATES PATENTS

| 2,215,213 | 9/1940 | Ellis............................... | 324/30 |
| 3,436,320 | 4/1969 | Marsh............................ | 324/71 X |

*Primary Examiner*—Michael J. Lynch
*Attorneys*—Roland H. Shubert and Ernest S. Cohen ABSTRACT: A specially modified, two-electrode polarization probe is used to detect the onset of and qualitatively measure nonuniform or pitting corrosion of the galvanic type. Each probe electrode consists of a galvanic couple formed from two dissimilar metals in physical and electrical contact; one of the metals acting as an anode portion and the other acting as a cathode portion. Anode to cathode area ratio and total exposed surface areas of the two electrodes are substantially equal.

PATENTED DEC 28 1971 3,631,338

INVENTORS
VINCENT F. FITZPATRICK
RUSSELL B. RICHMAN

BY Ernest S. Cohen
Roland H. Shubert
ATTORNEYS

METHOD AND APPARATUS FOR DETERMINING GALVANIC CORROSION BY POLARIZATION TECHNIQUES

BACKGROUND OF THE INVENTION

A great deal of experimental work has been done to develop techniques and apparatus relating polarization curves to the corrosion of metals. Polarization curves generally are a representation of the changes in specimen potential caused by an externally applied current. Probably the simplest experimental technique is the galvanostatic or constant current method in which a current is passed between the corroding electrode and an auxiliary electrode, usually of platinum. Current is measured by use of a milliammeter and potential is measured against a third, or reference electrode.

An adaptation of this general procedure has become a well-established laboratory method for determining the instantaneous corrosion rates of metals. In the laboratory method, a small current ($\Delta I$) is passed through a metal specimen. The current and potential change ($\Delta E$) in the specimen are measured. The ratio of $\Delta E$ to $\Delta I$, termed the polarization resistance, has been found to be inversely proportional to the instantaneous corrosion current which in turn is proportional to the instantaneous corrosion rate of the metal specimen. A more detailed illustration of this procedure may be found in an article by Skold et al. appearing in *Corrosion*, V. 13, N 2, pages 139t–142t, Feb. 1957.

This laboratory method is difficult to use in routine industrial measurements because a reference electrode and precise electrode potential data are required. These difficulties have been largely overcome by the development of a test probe having two identical electrodes, one of the electrodes taking the place of the usual reference electrode. Corrosion current as determined by this system, is a function of the conductivity of the electrolyte and of the valence of the corroding ion going into solution. Electrolyte conductivity can be readily measured and valence of the corroding ion may be predicted from a knowledge of chemistry and of the system being studied. Hence, a correction factor may be determined for each system being studied.

The dual electrode probe is used by applying a small potential usually on the order of 20 millivolts or less, between the two electrodes. Current flowing between the two electrodes is measured and this value is given the designation A. Polarity is then reversed and a second current B is measured. The average of these two currents, $(A+B)/2$, is then adjusted by a correction factor determined for the system under study and this adjusted current is then proportional to the instantaneous corrosion rate. If the current values (A and B) are nearly the same, then the electrodes are at essentially equal potential and corrosion of the two electrodes is uniform. A difference in the two current values indicates the electrodes are at different potentials and that nonuniform attack or pitting is occurring. The greater the difference between the two currents, the more intense is the nonuniform or pitting attack. This difference cannot be translated into a quantitative measure of pitting depth but has proved to be a very useful tool for the qualitative detection and measurement of nonuniform corrosion.

SUMMARY OF THE INVENTION

It has now been found that galvanic corrosion can be detected and qualitatively measured by use of a special type of two-electrode polarization probe. By providing a particular type of electrode structure, galvanic corrosion may be detected, monitored, and differentiated from other types of corrosion taking place within the test environment. The probe design allows galvanic corrosion to be detected and measured as a function of changes in the polarization on the surface of the electrodes.

One embodiment of the probe structure utilizes a pair of electrodes, each comprising a galvanic couple. The galvanic couple may be formed by mechanically or metallurgically joining two dissimilar metals to form a composite electrode structure. A second embodiment comprises an electrode element of one metal having an electroplate of another metal covering a portion of the surface area thereof. Another embodiment comprises an integral electrode fabricated from two dissimilar metals by the coextrusion, explosive bonding and similar techniques.

In all cases, the two electrodes making up the probe are preferably substantially identical. Cathode to anode area ratio may be adjusted at will in any of the embodiments to conform to the ratio of metal areas exposed to the test environment or to adjust sensitivity of the probes.

Hence it is an object of this invention to provide means to detect and measure galvanic corrosion by polarization techniques.

It is another object of this invention to detect the onset and determine the relative intensity of galvanic corrosion occurring within a process vessel housing a corrosive fluid environment.

A specific object of this invention is to provide two-electrode polarization probes for the detection and monitoring of galvanic corrosion.

DETAILED DESCRIPTION OF THE INVENTION

The invention will be described in greater detail by reference to the drawings in which.

Figure 1:
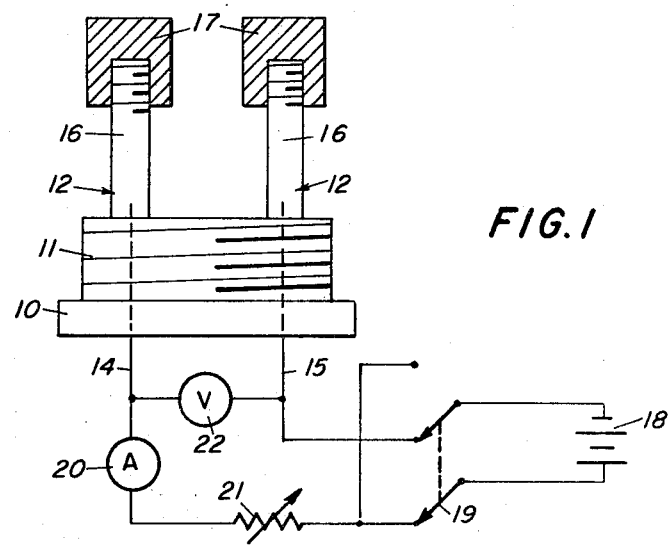
FIG. 1 is a schematic representation showing one form of apparatus and electrical measuring circuit of this invention.

Referring now to the drawings, the same numerical designation is used with the same part or parts of the apparatus wherever applicable. In FIG. 1 there is shown one embodiment of the two electrode test probe together with a schematic representation of an electrical circuit suitable for use with the probe.

The test probe comprises a base portion 10 which may be threaded at 11 for convenient installation in a standard fitting. Base 10 may be fabricated of any appropriate material, including plastics and metals, so long as electrodes 12 together with their respective electrical leads 14 and 15 are maintained in electrical isolation relative to the base and to each other.

Electrodes 12 may be of any appropriate shape but are conveniently circular in cross section and have a length on the order of about 1 to 6 inches. Each electrode comprises a galvanic couple having an anode portion 16 and a cathode portion 17. The galvanic couple is formed by fabrication of the anode and cathode portions from dissimilar metals. Anode to cathode area ratios may be adjusted at will. For example, probes with anode to cathode area ratios of 1 to 1 and 1 to 6 have been evaluated. As shown in FIG. 1, the cathode portion of each electrode may comprise a cap threadibly attached to the anode portion. Other methods of attachment, so long as electrical contact is achieved and maintained between the two portions, may also be used to fabricate the composite electrode. The finished electrodes are adjusted so that each electrode of a pair initially displays substantially the same total surface area and substantially the same anode to cathode area ratio to a test environment.

In operation, the probe is mounted on a test apparatus so that the electrodes are immersed in a test fluid. Onset and intensity of galvanic corrosion is monitored and determined using the electrical measuring circuit illustrated in the drawing. In that circuit, potential source 18, which may comprise a battery, is connected to polarity reversing switch 19. Electrical leads 14 and 15 are connected to switch 19 in the manner shown so as to allow reversal of circuit polarity by operation of the switch. Connected in series within lead 14 is ammeter 20 and variable resistance 21. Voltmeter 22 is connected across leads 14 and 15 so as to measure the potential between the electrodes.

A small potential, on the order of 20 mv. or less, is applied through the circuit across the two electrodes. The resulting current is read from ammeter 20 and this value is given the arbitrary designation A. Switch 19 is then thrown reversing the polarity of the circuit. A second resulting current is read on ammeter 20 and is given the designation B. If current A is substantially equal to current B, then essentially no pitting-type corrosion is occurring on the electrode. If, however, the two currents differ, then pitting-type corrosion is occurring. The greater the difference between the two currents, the more intense is the pitting attack. This relationship is a qualitative rather than a quantitative measure of corrosive intensity.

As may be seen, the disclosed process and apparatus provide means for readily monitoring the corrosive properties of fluids within a closed or semiclosed system such as a processing vessel or chemical reactor. Use of the probe on a continuous basis in processes such as water desalting can give early warning of apparatus damage or system failure. Conversely, probe data may be used to adjust process conditions to avoid excessive galvanic corrosion.

Figure 2:
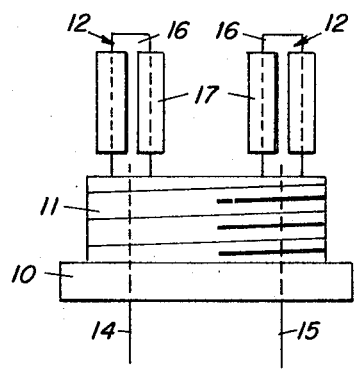
FIG. 2 depicts a variation of a two-electrode probe constructed in accordance with the invention.
Figure 3:
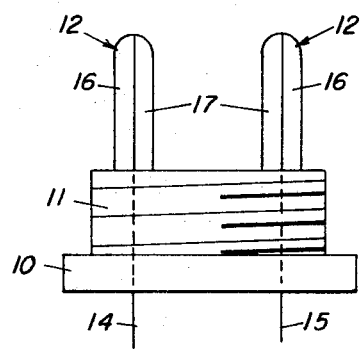
FIG. 3 represents another embodiment of the two electrode probe.

Referring now to FIGS. 2 and 3, there are shown additional embodiments of the probe structure. In these figures, electrodes 12 again comprise an anode portion 16 and a cathode portion 17. Cathode portion 16 of FIG. 2 may comprise a mechanical clip tightly fitting the anode portion of the electrode; may be metallurgically attached to the anode portion, or may comprise an electroplate over a portion of the anode surface. In all cases, anode to cathode area ratio may be adjusted at will. In FIG. 3, the electrodes are formed by fabrication of two metals into an integral unit by means of coextrusion, explosive bonding or similar techniques.

The embodiments of the invention illustrated by FIGS. 2 and 3 are utilized in the same manner as was illustrated in the discussion of FIG. 1. It is readily evident that a variety of other structural arrangements of the probe electrodes may be provided to accomplish substantially the same result. Similarly, a number of equivalent circuit arrangements will be obvious to those skilled in the art.

What is claimed is:

1. A device for the detection and measurement of galvanic corrosion by polarization techniques which comprises:
   a. a pair of electrodes, each electrode consisting of a galvanic couple formed from two dissimilar metals in physical and electrical contact, one of the metals comprising an anode portion and the other comprising a cathode portion, both electrodes having substantially equal surface areas and having substantially the same anode to cathode area ratio;
   b. a base member supporting the electrodes in a fixed physical relationship for exposure to a test environment, the base member electrically insulating one electrode from the other;
   c. electrical conducting members communicating between a terminal point of each electrode and a point external to the test environment; and
   d. electrical means, adapted to produce a signal representative of corrosion onset and intensity, operably connected to said conducting members.

2. The device of claim 1 wherein said electrical means comprise means for impressing a known potential across the electrodes and measuring means to determine magnitude of current flow across the electrodes resulting from the impressed potential.

3. The device of claim 1 wherein the galvanic couple comprises an anode portion mechanically attached to a cathode portion.

4. The device of claim 1 wherein the galvanic couple comprises an anode portion metallurgically bonded to a cathode portion.

5. The device of claim 1 wherein the galvanic couple comprises an electroplate of one metal over a portion of the surface of a dissimilar metal.

6. A process for detecting the onset and qualitatively determining the intensity of galvanic corrosion which comprises:
   a. immersing a pair of electrodes in a fluid contained within a test environment, each of the electrodes comprising a galvanic couple, both electrodes having substantially equal surface areas and having substantially the same anode to cathode area ratio;
   b. impressing an electrical potential of known magnitude and polarity across the electrodes and measuring a first current flow generated thereby;
   c. impressing a second electrical potential having equal magnitude but opposite polarity across the electrodes and measuring a second current flow generated thereby, and
   d. determining the average of and the difference in magnitude between the first and second measured currents.

7. The process of claim 6 wherein each electrode is formed of an anode portion of one metal and a cathode portion of a dissimilar metal, the anode and cathode portions being in electrical contact to form a galvanic couple.

8. The process of claim 7 wherein the impressed electrical potential has a value less than about 20 mv.

* * * * *